(12) United States Patent
Wu et al.

(10) Patent No.: US 12,314,715 B2
(45) Date of Patent: May 27, 2025

(54) TRACKING OF STORE OPERATIONS

(71) Applicant: SiFive, Inc., San Mateo, CA (US)

(72) Inventors: Yueh Chi Wu, Taichung (TW); Yohann Rabefarihy, Roquebrune-sur-argen (FR)

(73) Assignee: SiFive, Inc., Santa Clara, CA (US)

( * ) Notice: Subject to any disclaimer, the term of this patent is extended or adjusted under 35 U.S.C. 154(b) by 32 days.

(21) Appl. No.: 18/335,528

(22) Filed: Jun. 15, 2023

(65) Prior Publication Data

US 2024/0220244 A1 Jul. 4, 2024

Related U.S. Application Data

(60) Provisional application No. 63/435,861, filed on Dec. 29, 2022.

(51) Int. Cl.
*G06F 9/22* (2006.01)
*G06F 9/24* (2006.01)

(52) U.S. Cl.
CPC ...................... *G06F 9/24* (2013.01)

(58) Field of Classification Search
CPC ........................................................ G06F 9/24
See application file for complete search history.

(56) References Cited

U.S. PATENT DOCUMENTS

| | | | | |
|---|---|---|---|---|
| 5,163,157 A * | 11/1992 | Yamano | ................. | G06F 9/3826 712/E9.046 |
| 2011/0214127 A1* | 9/2011 | Lien | ...................... | G06F 9/3842 718/102 |
| 2015/0242250 A1* | 8/2015 | Guthrie | ................. | G06F 9/5088 711/137 |
| 2015/0242251 A1* | 8/2015 | Guthrie | ............... | G06F 12/1072 711/137 |
| 2018/0285118 A1* | 10/2018 | Eisen | ................... | G06F 9/30145 |
| 2020/0089559 A1* | 3/2020 | Ainsworth | .......... | G06F 11/1629 |
| 2022/0050681 A1* | 2/2022 | Lloyd | ................. | G06F 9/30047 |
| 2022/0137977 A1* | 5/2022 | Kothinti Naresh | ... | G06F 9/3834 712/205 |
| 2023/0318865 A1* | 10/2023 | Haridas | ............... | H04L 12/1877 370/390 |

FOREIGN PATENT DOCUMENTS

| EP | 1296230 A2 * | 3/2003 | ......... G06F 9/30065 |
|---|---|---|---|
| WO | WO-2020251677 A1 * | 12/2020 | ......... G06F 9/30043 |

* cited by examiner

*Primary Examiner* — Cheng Yuan Tseng
(74) *Attorney, Agent, or Firm* — Kilpatrick Townsend & Stockton LLP

(57) ABSTRACT

Apparatus and methods for tracking sub-micro-operations and groups thereof are described. An integrated circuit includes a load store unit configured to receive store micro-operations cracked from a vector store instruction. The load store unit is configured to unroll multiple store sub-micro-operations from each of the store micro-operations. The load store unit includes an issue status vector to track issuance of each sub-micro-operation, an unroll status vector to track unrolling of each sub-micro-operation associated with a group of sub-micro-operations, and a replay status vector to track a replayability of sub-micro-operations associated with the group of sub-micro-operations.

16 Claims, 7 Drawing Sheets

TRACKING OF STORE OPERATIONS

This application claims the benefit of priority to U.S. Provisional Patent Application Ser. No. 63/435,861 filed Dec. 29, 2022, and entitled "Tracking Of Store Operations", the entire disclosures of which is hereby incorporated by reference.

TECHNICAL FIELD

This disclosure relates generally to integrated circuits and, more specifically, store operations.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The processor may execute instructions out-of-order or be an on out-of-order processor. A store instruction may be cracked into one or more micro-operations. A load/store unit (LSU) may unroll a micro-operation into multiple sub-micro-operations. This may be done by the LSU in an in-order fashion. The LSU may establish a store queue entry for each sub-micro-operation. The LSU then may then issue each sub-micro-operation to retrieve the data and put the data in the store queue entry associated with the sub-micro-operation. The issuing of the sub-micro-operations may be done out-of-order to optimize performance. This means that for each micro-operation, the LSU needs to the sub-micro-operations which were unrolled from the micro-operation, whether all of the associated sub-micro-operations have completed execution, and/or whether any associated sub-micro-operation is replayable. That is, a tracking mechanism is needed to track completion of the sub-micro-operations so that the micro-operations and/or store instruction can be retired.

Described are methods and circuitry which facilitate and/or enable tracking of sub-micro-operations associated with a micro-operation. In implementations, the LSU may include, but is not limited to, three bit vectors which track issue status, unrolled status, and replay status. The first bit vector is a per-micro-operation bit vector which tracks the issue status. The first bit vector is grouped into LMUL entries, with each group entry containing (first bit vector number of bits)/(LMUL) number of bits, where LMUL is the vector group size. That is, LMUL specifies the number of vector registers that are grouped for an instruction. The second bit vector is a per-first bit vector-group bit which tracks if a group has all its sub-micro-operations unrolled by the LSU. The third bit vector is a per-first bit vector-group bit which tracks if any sub-micro-operations in a group or per group basis can cause a replay for that group. The three bit vectors collectively support unrolled and replayable micro-operation tracking.

Figure 1:
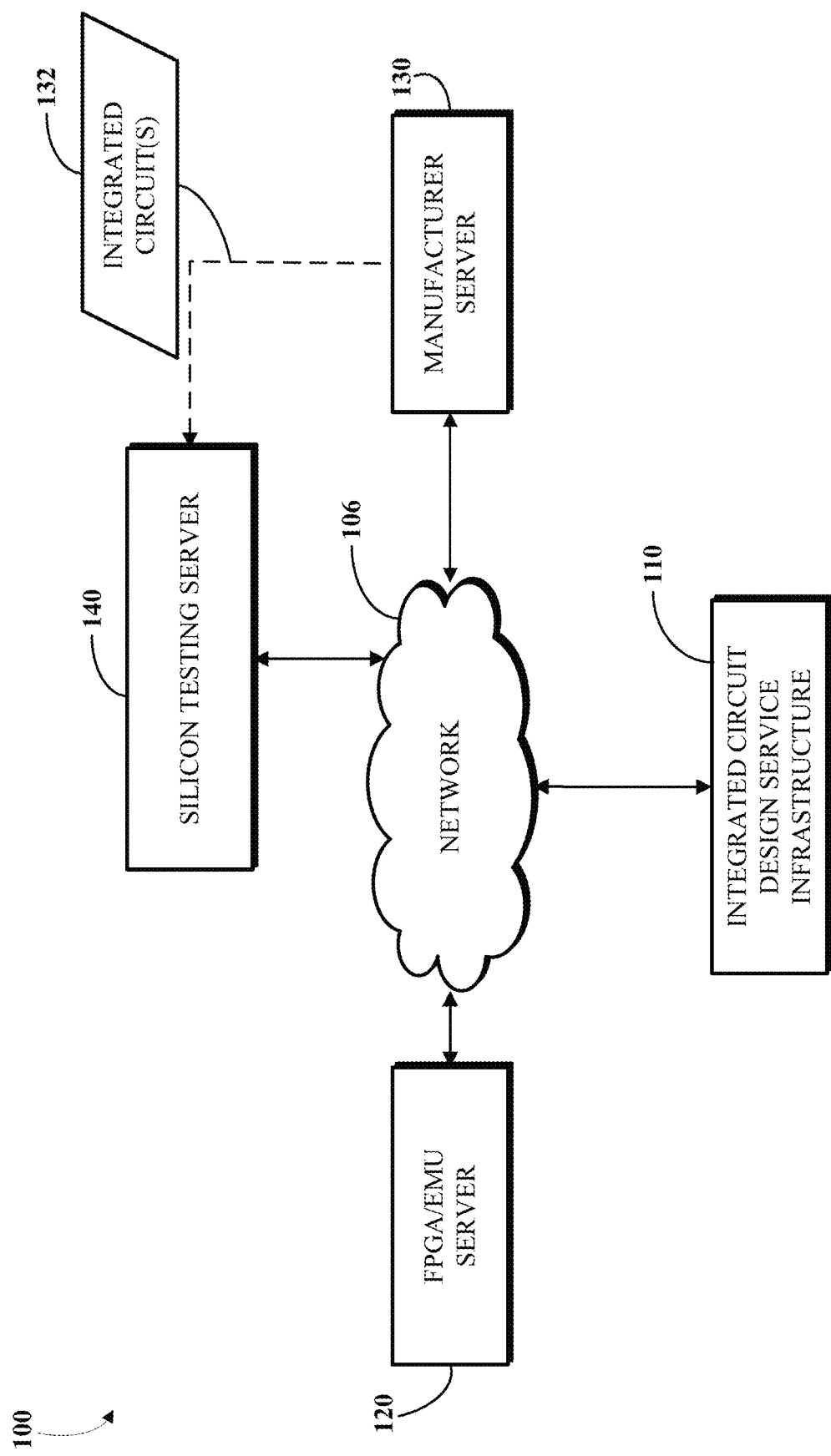
FIG. 1 is a block diagram of an example of a system for facilitating generation and manufacture of integrated circuits.

To describe some implementations in greater detail, reference is first made to examples of hardware and software structures used to implement a system including components that may facilitate and/or enable tracking of sub-micro-operations associated with a micro-operation. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-6.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
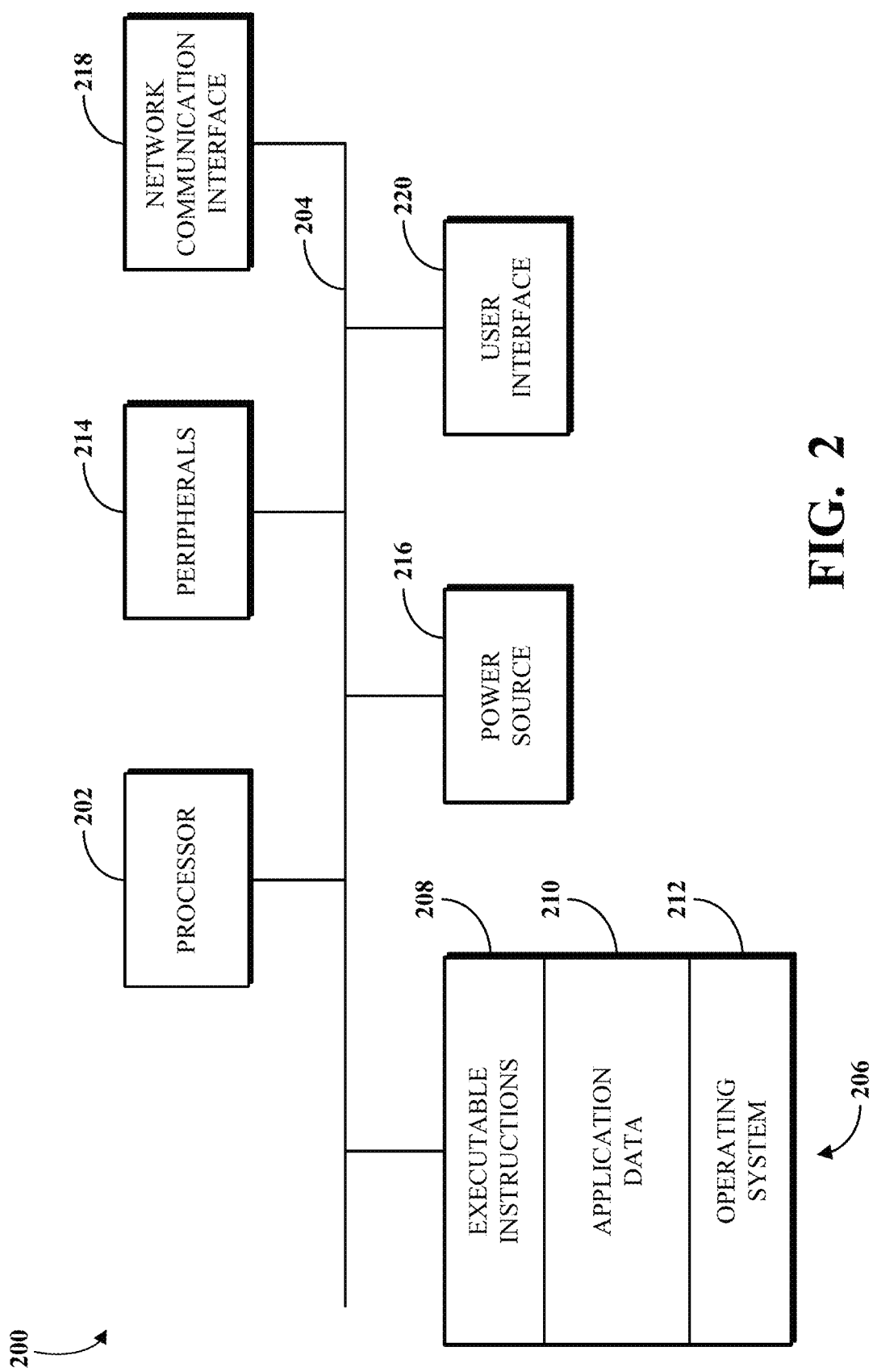
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-6.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
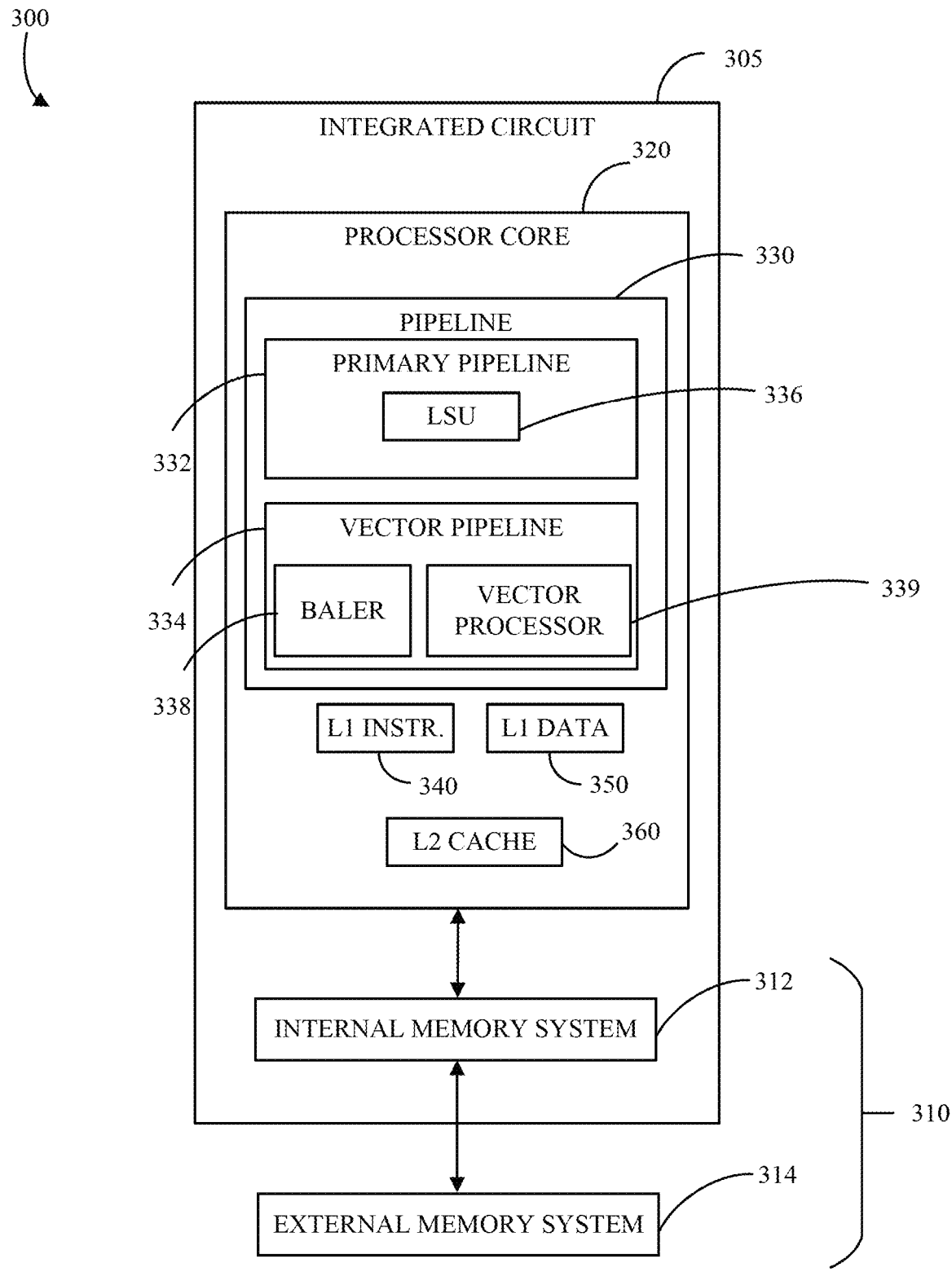
FIG. 3 is a block diagram of an example of an integrated circuit for tracking sub-micro-operation status and groups thereof.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360. Each of the one or more pipelines 330 may include a primary pipeline 332 and a vector pipeline 334. The primary pipeline 332 and the vector pipeline 334 may each have separate decode units, rename units, dispatch units, execution units, physical and/or virtual registers, caches, queues, data paths, and/or other logic associated with instruction flow. The primary pipeline 332 may include an LSU 336 as described herein. The vector pipeline 334 may include a baler 338 and a vector processor 339 as described herein. In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
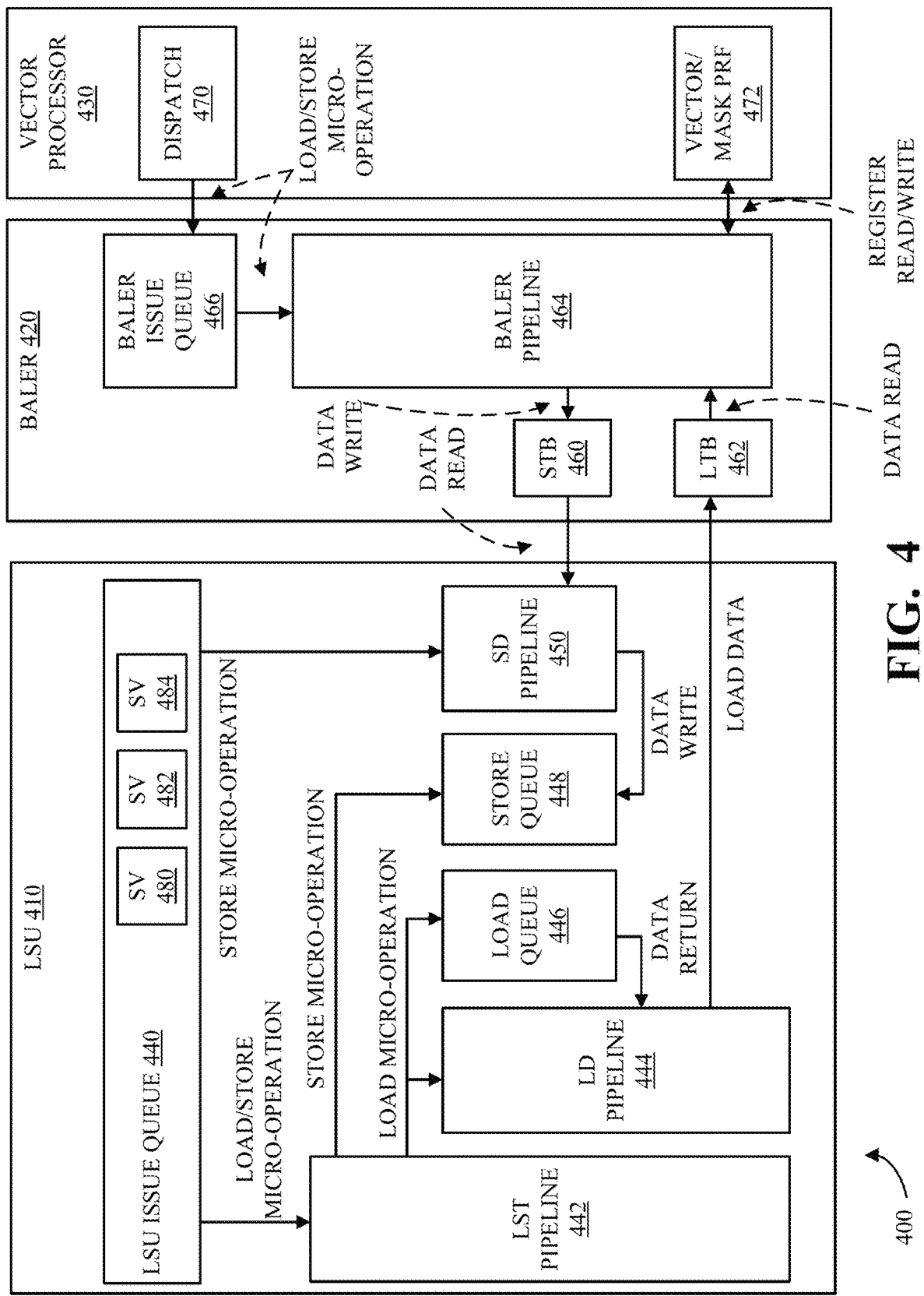
FIG. 4 is a block diagram illustrating a relationship between a load store unit (LSU), a Baler, and a Vector Unit or Processor (VU).

FIG. 4 is a block diagram of a processor or system 400 which illustrates processing flow between a load store unit (LSU) 410, a Baler 420, and a Vector Unit or Processor (VU) 430. The LSU 410 may include, but is not limited to, an LSU issue queue 440, a load store transfer (LST) pipeline 442, a load data (LD) pipeline 444, a load queue 446, a store queue 448, and a store data (SD) pipeline 450. The Baler 420 includes, but is not limited to, a store transfer buffer (STB) 460, a load transfer buffer (LTB) 462, a Baler pipeline 464, and a Baler issue queue 466. The VU 430 includes, but is not limited to, a dispatch unit 470 and vector and mask physical register files (PRFs) 472. The processor 400 and each component in the processor 400 is illustrative and can include additional, fewer, or different components which may be similarly or differently architected without departing from the scope of the specification and claims herein. Moreover, the illustrated components can perform other functions without departing from the scope of the specification and claims herein.

The Baler 420 is the intermediate buffer between the LSU 410 and the VU 430. The Baler 420 buffers the load data from the LSU 410 and the store data from the VU 430. The tracking of data readiness is done in the Baler 420 to wake-up the LSU 410 or the VU 430 once the data is ready to be accessed.

The LTB 462 is the load buffer in the Baler 420 that handles the load data. Each entry in the LTB 462 stores VLEN-wide data read from memory, where VLEN is the vector register width in bits. For each non-segmented load element, the LTB 462 loads to the same place in a LTB entry (functionally similar to a vector register). For each segmented load element, the LTB 462 loads the segments in an in-memory format (segments of an element are placed sequentially).

The STB 460 is the store buffer in the Baler 420 that handles the store data. Each entry in the STB 460 stores VLEN-wide data read from the vector PRF 472. For each non-segmented store, the content in the vector PRF 472 is copied directly to the STB entry. For a segmented store, the STB 460 stores the segments in an in-memory format (segments of an element are placed sequentially).

The dispatch unit 470 in the VU 430 cracks load store instructions and dispatches load store micro-operations for processing through the processor 400. The VU 430 may process load store instructions in an out-of-order manner.

The LSU issue queue 440 is a queue which stores dispatched micro-operations prior to issuing the micro-operations to one or more of the execution pipelines. For example, the one or more of the execution pipelines can include, but is not limited to, the LST pipeline, the LD pipeline, and the SD pipeline. The LSU issue queue 440 checks the issue dependency of the micro-operation before issuing the micro-operation, including but not limited to, source readiness, ordering, sub-micro-operations tracking, and micro-operations replay handling. When a micro-operation is replayed from an execution pipeline, the LSU issue queue 440 resets the issue status to the replayed micro-operation and restarts the issue process.

The LST pipeline 442 is responsible for address generation and establishment of entries in the load queue 446 and the store queue 448. The LST pipeline 442 may unroll a store micro-operation into sub-micro-operations in an in-order manner and establish an entry in the store queue 448 for each unrolled sub-micro-operation.

The SD pipeline 450 is responsible for acquiring data for store micro-operations and puts the data to the store queue 448. The store queue 448 stores the data that is waiting for write back to memory.

Operationally, the LSU issue queue 440 issues a store micro-operation to the LST pipeline 442. The LST pipeline 442 may unroll the store micro-operation into multiple store sub-micro-operations and establishes an entry in the store queue 448 for each unrolled store sub-micro-operation. The LSU issue queue 440 issues each store sub-micro-operation to the SD pipeline 450 to retrieve the data and put the data in the associated entry in the store queue 448. Noting that the processor 400 and/or the VU 430 is an out-of-order processor, the LSU issue queue 440 tracks an issue status of each store sub-micro-operations, tracks whether each store sub-micro-operation belonging to a group has been unrolled, and tracks whether any sub-micro-operation belonging to a group is replayable (collectively "sub-micro-operation tracking information"). A store micro-operation and/or store instruction can be retired upon successfully checking via the sub-micro-operation tracking information that all store-micro-operations have been completed or executed.

Figure 5:
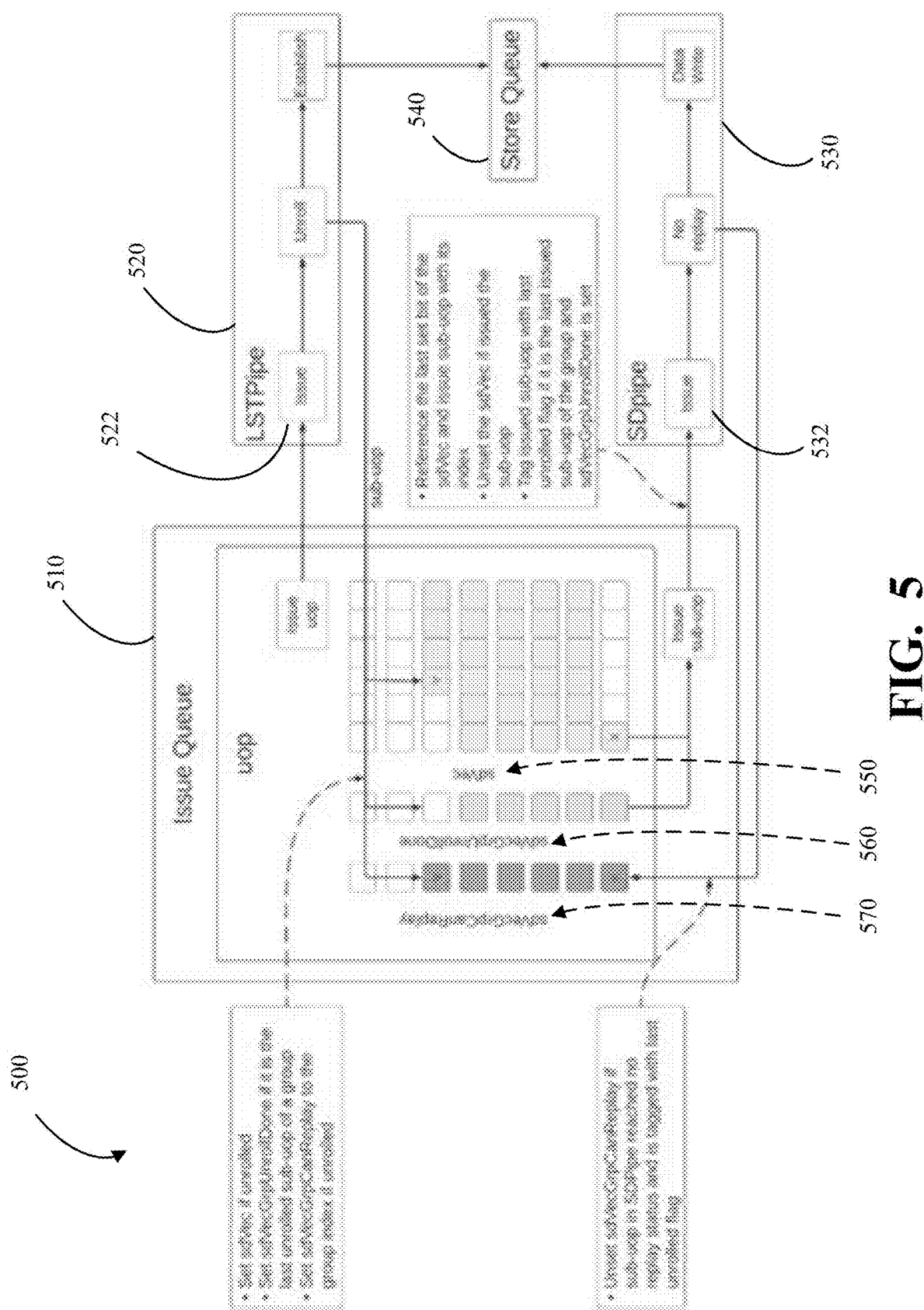
FIG. 5 is a block diagram illustrating a normal execution with tracking for sub-micro-operation status and groups thereof.
Figure 6:
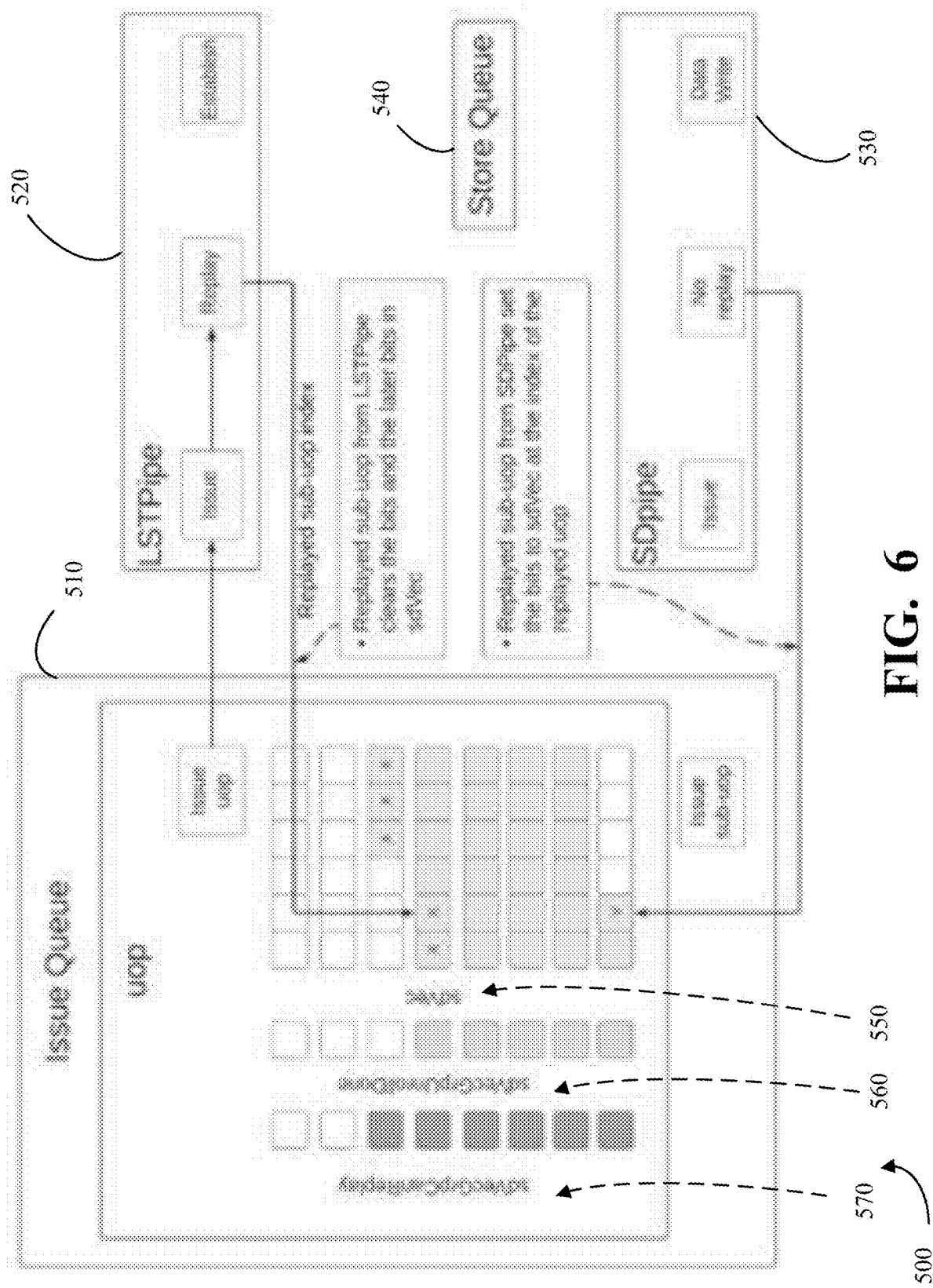
FIG. 6 is a block diagram illustrating a replay execution with tracking for sub-micro-operation status and groups thereof.

The LSU issue queue 440 maintains the sub-micro-operation tracking information using a store vector (SV) 480, an SV 482, and an SV 484. The SV 480 is a per-micro-operation bit vector which tracks an issue status of each sub-micro-operation unrolled from each micro-operation cracked from a store instruction. The SV 480 is grouped into or by a corresponding LMUL size, where each LMUL index is associated with 1 group in the vector. The SV 482 is a per-group bit which tracks whether all sub-micro-operations in each group have been unrolled by the LST pipeline 442, where each LMUL index is associated with 1 bit in the vector. The SV 484 is a per-group bit which tracks whether one or more sub-micro-operations in a group are replayable, where each LMUL index is associated with 1 bit in the vector. In FIGS. 5 and 6, the SV 480 is denoted as sdVec, the SV 482 is denoted as sdVecGrpUnrollDone, and the SV 484 is denoted as sdVecGrpCanReplay. Table 1 illustrates an example of the three vectors.

TABLE 1

Assume a store instruction with LMUL = 8. The store instruction is cracked into 8 micro-operations (MO) and each MO is unrolled into X sub-MOs:
MO #1; MO #2; MO #3; MO #4; MO #5; MO #6; MO #7; MO #8
For SV 480: X bits for MO #1; X bits for MO #2; X bits for MO #3; X bits for MO #4; X bits for MO #5; X bits for MO #6; X bits for MO #7; X bits for MO #8
For SV 482: 1 bit for MO #1; 1 bit for MO #2; 1 bit for MO #3; 1 bit for MO #4; 1 bit for MO #5; 1 bit for MO #6; 1 bit for MO #7; 1 bit for MO #8
For SV 484: 1 bit for MO #1; 1 bit for MO #2; 1 bit for MO #3; 1 bit for MO #4; 1 bit for MO #5; 1 bit for MO #6; 1 bit for MO #7; 1 bit for MO #8

FIG. 5 is a block diagram of an LSU 500 illustrating a normal execution processing flow with tracking for micro-operations cracked from a store instruction and sub-micro-operations unrolled from the micro-operations and FIG. 6 is a block diagram of the LSU 500 illustrating a replay execution processing flow. In implementations, the LSU 500 can be implemented in the system 300 and/or the system 400. The normal execution processing flow and the replay execution processing flow are shown with respect to an issue queue 510, a LST pipeline (LSTPipe) 520, a store data pipeline (SDpipe) 530, and a store queue 540, as appropriate and applicable. For each dispatched micro-operation, the issue queue 540 maintains a sdVec 550 to track an issue status of sub-micro-operations, a sdVecGrpUnrollDone 560 to track an unrolled status of a sub-micro-operation group, and a sdVecGrpCanReplay 570 to track a replay status of a sub-micro-operation group, as described herein. The LSU 500 and each component in the LSU 500 is illustrative and can include additional, fewer, or different components which may be similarly or differently architected without departing from the scope of the specification and claims herein. Moreover, the illustrated components can perform other functions without departing from the scope of the specification and claims herein.

Operationally, a store micro-operation is dispatched to the issue queue 510. At or near issue dispatch, the sdVec 550 is reset to false (unshaded boxes). Each bit in the sdVec 550 corresponds to an unrolled store micro-operation, i.e., a sub-micro-operation. Since the unroll index for each sub-micro-operation is known, the unroll index is used for indexing into the sdVec 550. At or near issue dispatch, the sdVecGrpUnrollDone 560 is reset to true. At or near issue dispatch, the sdVecGrpCanReplay 570 is reset to false. It is noted that the initial state of the sdVecGrpUnrollDone 560 does not matter since the sdVecGrpUnrollDone 560 is the bit which indicates if the micro-operation selected from the sdVec 550 is the last unrolled one from that sdVec group and that it's not possible to have a sdVec bit set before such sub-micro-operation is unrolled in the LST pipeline 442 (and set the meaningful value in the sdVecGrpUnrollDone 560).

The issue queue 510 issues the micro-operation to an issue queue 522 in the LST pipeline 520. An unrolling unit or circuit 524 unrolls the micro-operation into sub-micro-operations upon receipt of the micro-operation from the issue queue 522. For each sub-micro-operation in the LST pipeline 520, the unrolling circuit 524 sets a corresponding bit in the sdVec 550 and establishes an entry in the store queue 540. The LST pipeline 520 and/or the unrolling circuit 524 not only sets the sdVec 550 at the index of the unroll index, but also sets the sdVecGrpUnrollDone 560 at the index of the group derived from the unroll index if the sub-micro-operation is the last sub-micro-operation of a group. The LST pipeline 520 and/or the unrolling circuit 524 also sets the sdVecGrpCanReplay 570 to true at the index of the group of the sub-micro-operation.

The issue queue 510 checks a minimum index (i.e., the oldest sub-micro-operation) of the set bits in the sdVec 550 to check if a micro-operation has any sub-micro-operations which need to be issued to the SD pipeline 530 to write data to the store queue 540. If a sub-micro-operation is found, the issue queue 510 issues the sub-micro-operation with the index to an issue queue 532 in the SD pipeline 530. The issue queue 510 resets a corresponding bit in the sdVec for each issued sub-micro-operation. The issue queue 510 tags the sub-micro-operation with a last group unroll flag if the corresponding bit in the sdVec 550 is the last set bit in a corresponding sdVec group (i.e., the group to which the sub-micro-operation belongs to) and a corresponding bit in the sdVecGrpUnrollDone 560 is set for the sdVec group.

The issue queue 510 monitors the stages in the SD pipeline 530. If the issue queue 510 determines that a sub-micro-operation that is tagged as the last sub-micro-operation for a sdVec group reaches a stage where it is not possible to cause replay, then a bit at the group index of such sub-micro-operation is unset in the sdVecGrpCanReplay 570. If the store micro-operation in the issue queue 510 has all the bits in the sdVecGrpCanReplay 570 set to false (i.e., they are all reset), then no sub-micro-operations associated with that store micro-operation can cause a replay. The store micro-operation can then be retired. If all store micro-operations for the store instruction are retired, then the store instruction can then be retired.

Now referring also to FIG. 6, the LST pipeline 520 and the SD pipeline 530 can both cause sub-micro-operation replays. In the instance of a LST pipeline 520 replay, the sub-micro-operation that causes a replay unsets all the later bits in sdVec 550 starting from the unroll index of the replayed sub-micro-operation. The LST pipeline 520 will reissue the sub-micro-operations starting from the replayed unroll index. In the instance of a SD pipeline 530 replay, the sub-micro-operation that causes the replay sets the bit in the sdVec 550 back to true at the unroll index of the replayed sub-micro-operation. The process then follows the normal execution processing flow as described herein.

Figure 7:
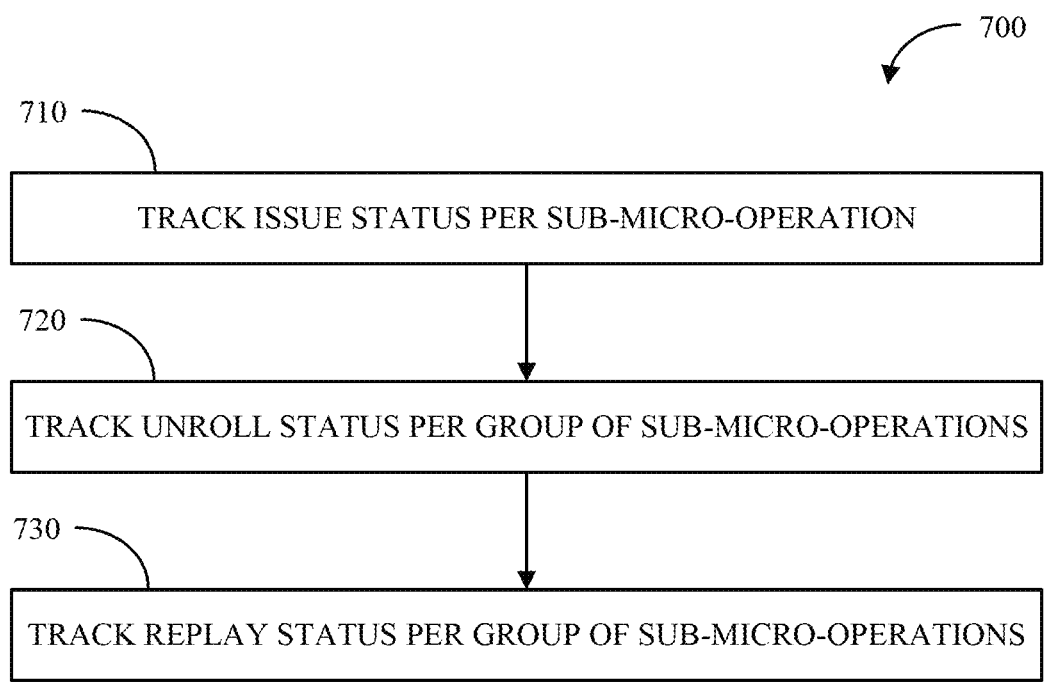
FIG. 7 is a flow chart of a method for tracking for sub-micro-operation status and groups thereof.

FIG. 7 is a flow chart of a method 700 for tracking for sub-micro-operation status and groups thereof. The method 700 may include: tracking 710 an issue status of sub-micro-operations; tracking 720 an unroll status of sub-micro-operations in a group; and tracking 730 a replay status of sub-micro-operations in a group. The method 700 may be performed in the system 100 of FIG. 1, the system 200 of FIG. 2, the system 300 of FIG. 3, the system 400 of FIG. 4, and/or the LSU 500 of FIG. 5 and FIG. 6.

The method 700 may include tracking 710 an issue status of sub-micro-operations. An LSU or an issue queue in the LSU receives store micro-operations from a cracked store instruction. For example, the store instruction is a vector store instruction. In implementations, the number of store micro-instructions may be associated with a vector group size. For example, if the vector group size is 8 in the store instruction, then the store instruction will be cracked into 8 store micro-operations. In implementations, the LSU or a LST pipeline in the LSU can unroll each store micro-operation into multiple store sub-micro-operations. The LSU or the LST pipeline can establish an entry in a store queue in the LSU for each store sub-micro-operation. The LSU or the LST pipeline can set a bit in an issue status vector for each store sub-micro-operation. The issue status vector is a per-sub-micro-operation vector. The LSU or issue queue can reset a bit in the issue status vector upon issuing a store sub-micro-operation to a SD pipeline to write data to a corresponding entry in the store queue. In the occurrence of a LST pipeline replay (due to data unavailability, misprediction, branching error, and the like), the LSU, the LST pipeline, and/or the issue queue resets or clears a corresponding bit in the issue status vector and resets or clears all later (younger) bits in the issue status vector. In the occurrence of a SD pipeline replay (due to data unavailability, misprediction, branching error, and the like), the LSU, the SD pipeline, and/or the issue queue sets a corresponding bit in the issue status vector.

The method 700 may include tracking 720 an unroll status of sub-micro-operations in a group. In implementations, the LSU or a LST pipeline in the LSU also sets a bit in an unroll status vector when the sub-micro-operation is a last sub-micro-operation for a group containing the sub-micro-operation. The unroll status vector is a per-group of sub-micro-operations vector.

The method 700 may include tracking 730 a replay status of sub-micro-operations in a group. In implementations, the LSU or a LST pipeline in the LSU also sets a bit in a replay status vector for a corresponding group. The replay status vector is a per-group of sub-micro-operations vector. If a sub-micro-operation is to be issued to a SD pipeline, then the LSU, the SD pipeline, and/or the issue queue sets a last group unroll flag when the sub-micro-operation is the last sub-micro-operation in the associated group and a corresponding bit in the unroll status vector is set. A bit in the replay status vector is reset or cleared when a last sub-micro-operation in a group has reached a no replay stage in the SD pipeline. When all the bits in the replay status vector are reset or cleared, then the store micro-operation can be retired as no sub-micro-operation replays are possible.

In an implementation, an integrated circuit including a load store unit configured to receive store micro-operations cracked from a vector store operation, and unroll each store micro-operation into multiple sub-micro-operations, the load store unit including an issue status vector configured to track issuance of each sub-micro-operation to a store data pipeline to write data, an unroll status vector to track unrolling of each sub-micro-operation associated with a group of sub-micro-operations, and a replay status vector to track replayability of sub-micro-operations associated with the group of sub-micro-operations.

In implementations, the issue status vector is a per-sub-micro-operation vector. In implementations, a bit in the issue status vector is set when a sub-micro-operation is unrolled from the store micro-operation. In implementations, a bit in the issue status vector is reset upon issuing the sub-micro-operation to a store data pipeline to write data to a corresponding entry in a store queue. In implementations, wherein, for a load store transfer pipeline replay, a corresponding bit in the issue status vector is reset and all younger bits are reset in the issue status vector. In implementations, wherein, for a store date pipeline replay, a corresponding bit in the issue status vector is reset. In implementations, the unroll status vector is a per-group of sub-micro-operations vector. In implementations, a bit in the issue status vector is set when a sub-micro-operation is unrolled from the store micro-operation and a bit in the unroll status vector is set when the sub-micro-operation is a last sub-micro-operation for a group containing the sub-micro-operation. In implementations, the replay status vector is a per-group of sub-micro-operations vector. In implementations, a bit in the issue status vector is set when a sub-micro-operation is unrolled from the store micro-operation and a bit in the replay status vector is set for a group containing the sub-micro-operation. In implementations, wherein, upon issuance of a sub-micro-operation to a store data pipeline, a last group unroll flag is set when the sub-micro-operation is the last sub-micro-operation in a corresponding group and a corresponding bit in the unroll status vector is set. In implementations, a bit in the replay status vector is reset when a last sub-micro-operation in a corresponding group has reached a no replay stage in a store data pipeline. In implementations, a bit in the issue status vector is set when a sub-micro-operation is unrolled from the store micro-operation, a bit in the unroll status vector is set when the sub-micro-operation is a last sub-micro-operation for a group containing the sub-micro-operation, and a bit in the replay status vector is set for a group containing the sub-micro-operation.

In an implementation, a method including tracking, with an issue status vector, issuance of each sub-micro-operation to a store data pipeline to write data, wherein multiple sub-micro-operations are unrolled from a micro-operation and multiple micro-operations are cracked from a store instruction, tracking, with an unroll status vector, unrolling of each sub-micro-operation associated with a group of sub-micro-operations, and tracking, with a replay status vector, replayability of sub-micro-operations associated with the group of sub-micro-operations.

In implementations, the issue status vector is a per-sub-micro-operation vector. In implementations, the method further including setting a bit in the issue status vector when a sub-micro-operation is unrolled from the store micro-operation. In implementations, the method further including resetting a bit in the issue status vector upon issuance of the sub-micro-operation to a store data pipeline to write data to a corresponding entry in a store queue. In implementations, the method further including resetting a corresponding bit and all younger bits in the issue status vector for a load store transfer pipeline replay. In implementations, the method further including resetting a corresponding bit in the issue status vector for a store date pipeline replay. In implementations, the unroll status vector is a per-group of sub-micro-operations vector. In implementations, the method further including setting a bit in the unroll status vector when the sub-micro-operation is a last sub-micro-operation for a group containing the sub-micro-operation. In implementations, the replay status vector is a per-group of sub-micro-operations vector. In implementations, the method further including setting a bit in the replay status vector for a group containing the sub-micro-operation. In implementations, the method further including setting, upon issuance of a sub-micro-operation to a store data pipeline, a last group unroll flag when the sub-micro-operation is the last sub-micro-operation in a corresponding group and a corresponding bit in the unroll status vector is set. In implementations, the method further including resetting a bit in the replay status vector when a last sub-micro-operation in a corresponding group has reached a no replay stage in a store data pipeline.

In an implementation, a non-transitory computer readable medium comprising a circuit representation that, when processed by a computer, is used to program or manufacture an integrated circuit comprising a load store unit configured to receive store micro-operations cracked from a vector store operation, and unroll each store micro-operation into multiple sub-micro-operations, the load store unit including an issue status vector configured to track issuance of each sub-micro-operation to a store data pipeline to write data, an unroll status vector to track unrolling of each sub-micro-operation associated with a group of sub-micro-operations, and a replay status vector to track replayability of sub-micro-operations associated with the group of sub-micro-operations.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
    a load store unit configured to receive store micro-operations cracked from a vector store operation, and unroll each store micro-operation into multiple sub-micro-operations, the load store unit including:
    an issue status vector configured to track issuance of each sub-micro-operation to a store data pipeline to write data;
    an unroll status vector to track unrolling of a group of sub-micro-operations; and
    a replay status vector to track replayability of sub-micro-operation associated with the group of sub-micro-operations,
    wherein a first bit in the issue status vector is reset upon issuing a sub-micro-operation to the store data pipeline to write corresponding data to a corresponding entry in a store queue, and a second bit in the issue status vector is set when the sub-micro-operation is unrolled.

2. The integrated circuit of claim 1, wherein the issue status vector is a per-sub-micro-operation vector.

3. The integrated circuit of claim 1, wherein, for a load store transfer pipeline replay, a corresponding bit in the issue status vector is reset and all younger bits are reset in the issue status vector.

4. The integrated circuit of claim 1, wherein, for a store data pipeline replay, a corresponding bit in the issue status vector is reset.

5. The integrated circuit of claim 1, wherein the unroll status vector is a per-group of sub-micro-operations vector.

6. The integrated circuit of claim 5, wherein a second bit in the issue status vector is set when the sub-micro-operation is unrolled and a third bit in the unroll status vector is set when the sub-micro-operation is a last sub-micro-operation for a group containing the sub-micro-operation.

7. The integrated circuit of claim 1, wherein the replay status vector is a per-group of sub-micro-operations vector.

8. The integrated circuit of claim 7, wherein a second bit in the issue status vector is set when the sub-micro-operation is unrolled and a third bit in the replay status vector is set for a group containing the sub-micro-operation.

9. The integrated circuit of claim 8, wherein, upon issuance of the sub-micro-operation to the store data pipeline, a last group unroll flag is set when the sub-micro-operation is a last sub-micro-operation in a corresponding group and a corresponding bit in the unroll status vector is set.

10. The integrated circuit of claim 8, wherein a third bit in the replay status vector is reset when a last sub-micro-operation has reached a no replay stage in the store data pipeline.

11. The integrated circuit of claim 1, wherein a second bit in the issue status vector is set when the sub-micro-operation is unrolled, a third bit in the unroll status vector is set when the sub-micro-operation is a last sub-micro-operation for a group containing the sub-micro-operation, and a fourth bit in the replay status vector is set for a group containing the sub-micro-operation.

12. A method comprising:
    tracking, with an issue status vector, issuance of each sub-micro-operation to a store data pipeline to write data, wherein multiple sub-micro-operations are unrolled from a micro-operation and multiple micro-operations are cracked from a store instruction, wherein a first bit in the issue status vector is reset upon issuance of a sub-micro-operation to the store data pipeline to write corresponding data to a corresponding entry in a store queue;
    tracking, with an unroll status vector, unrolling a group of sub-micro-operations, wherein the unroll status vector is a per-group of sub-micro-operations vector;
    tracking, with a replay status vector, replayability of sub-micro-operations associated with the f sub-micro-group operations; and
    setting a second bit in the unroll status vector when the sub-micro-operation is a last sub-micro-operation for a group containing the sub-micro-operation.

13. The method of claim 12, further comprising:
    resetting a corresponding bit and all younger bits in the issue status vector for a load store transfer pipeline replay.

14. The method of claim 12, further comprising:
    resetting a corresponding bit in the issue status vector for a store data pipeline replay.

15. The method of claim 12, wherein the replay status vector is a per-group of sub-micro-operations vector and the method further comprising:
    setting a second bit in the replay status vector for a group containing the sub-micro-operation;

setting, upon issuance of the sub-micro-operation to the store data pipeline, a last group unroll flag when the sub-micro-operation is the last sub-micro-operation in a corresponding group and a corresponding bit in the unroll status vector is set; and resetting a third bit in the replay status vector when the last sub-micro-operation has reached a no replay stage in the store data pipeline.

16. One or more non-transitory computer-readable storage media storing instructions that, upon execution by one or more processors, cause operations comprising:

tracking, with an issue status vector, issuance of each sub-micro-operation to a store data pipeline to write data, wherein multiple sub-micro-operations are unrolled from a micro-operation and multiple micro-operations are cracked from a store instruction, wherein a first bit in the issue status vector is reset upon issuance of a sub-micro-operation to the store data pipeline to write corresponding data to a corresponding entry in a store queue, and wherein the issue status vector is a per-sub-micro-operation vector and the operations further comprise:

tracking, with an unroll status vector, unrolling of a group of sub-micro-operations;

tracking, with a replay status vector, replayability of sub-micro-operations associated with the group of sub-micro-operations; and setting a second bit in the issue status vector when the sub-micro-operation is unrolled.

* * * * *